SUPERCONDUCTIVE PARAMETRIC AMPLIFIER

Filed Dec. 30, 1960

INVENTOR
ROLF W. LANDAUER

BY Stephen J. Limanek
ATTORNEY

United States Patent Office 3,111,628

Patented Nov. 19, 1963

3,111,628

SUPERCONDUCTIVE PARAMETRIC AMPLIFIER

Rolf W. Landauer, Briarcliff Manor, N.Y., assignor to International Business Machines Corporation, New York, N.Y., a corporation of New York Filed Dec. 30, 1960, Ser. No. 79,926
5 Claims. (Cl. 330—4.5)

This invention relates to electrical circuits of the parametric type and more particularly to circuits of the above described type which employ the phenomenon of superconductivity.

Parametric circuits have recently been employed in the design of oscillators, amplifiers, various logical circuits, and other types of electrical circuits. Briefly, the parametric effect, as applied to electrical circuits, incorporates the well-known principle that a disturbance at one frequency is effective, when coupled through a non-linear device, to impart energy at a second predetermined frequency to a second network.

The various electrical parametric circuits are broadly classified in two general groups. The first group includes a first resonant circuit coupled to a second resonant circuit by means of a non-linear impedance, the non-linear impedance means generally consisting of the capacitance of a semiconductive diode which is reversed biased. This first group is generally described and known as the lumped constant type. The second group, basically, consists of a non-linear transmission line resonant to both an excitation frequency as well as a signal frequency. This second group is commonly known as the distributed constant type.

The phenomenon of superconductivity, which has been known for over 50 years, is characterized by the absence of electrical resistivity exhibited by certain materials below predetermined temperatures. Further, these superconductive temperatures are generally in the vicinity of absolute 0. Numerous electrical circuits have been formed by means of the interconnection of super conductive materials; these circuits being of both the active and passive types. Further discussion of the principles of superconductivity and circuits formed therefrom is found in "Progress in Cryogenics," volume 1, edited by K. Mendelssohn, published by Heywood & Company Ltd., London, 1959. More recently transmission line circuits utilizing the phenomenon of superconductivity are shown by U.S. Patent 2,962,681 issued to J. J. Lentz on November 29, 1960, and application Serial Number 16,431 filed on March 21, 1960, on behalf of J. C. Swihart and D. R. Young and assigned to the assignee of this application.

According to this invention, there is disclosed improved parametric circuits of the distributed constant type which utilize the phenomenon of superconductivity. Briefly, this invention includes a non-linear superconductive transmission line wherein the non-linearity of the transmission line is a function of the penetration depth of magnetic fields into the conductors of the line. Since the inductance of superconductive transmission line circuits is related to the magnetic field penetration depth, of the superconductive material and since the penetration depth can be caused to vary, parametric interaction is possible. Although, in general, this is a relatively weak non-linearity, the necessary parametric interaction requires only a large number of cycles of the electrical waves applied to the parametric circuit. It should be noted, however, that the Q's of superconductive transmission line circuits are relatively enormous and the relatively weak non-linearity exhibited results in no problem as long as wide band amplification or a rapid growth of the subharmonic is not expected. However, this limitation is offset by the fact that the carrier or pump frequency can be much higher than in the lumped type parametric circuits, before circuit losses become excessive.

Among the advantages of the superconductive parametric circuits of this invention is that a significant reduction in circuit noise is obtained over that which can be expected in conventional parametric circuits. Further, because the non-linearity is dependent on the intrinsic physics of a homogeneous material, it is possible to obtain reproducible and controllable characteristics from unit to unit. In addition, the superconductive parametric circuits of this invention can be included in either or both of the above referenced superconductive transmission line circuits without requiring wire connection as further explained in detail hereinafter.

It is an object of this invention to provide improved parametric amplifier circuits.

It is a further object of this invention to provide parametric circuits employing superconductivity.

Yet another object of this invention is to provide standing wave parametric circuits requiring only a single transmission line.

Still another object of this invention is to provide superconductive transmission line parametric circuits wherein the parametric effect is a function of the penetration depth of magnetic fields into the superconductive conductors of the transmission line.

Another object of the invention is to provide relatively noisefree parametric circuits.

A still further object of the invention is to provide improved parametric circuits exhibiting minimum circuit losses.

The foregoing and other objects, features and advantages of the invention will be apparent from the following more particular description of preferred embodiments of the invention, as illustrated in the accompanying drawings.

In the drawings:

FIG. 1 represents the standing waves developed along a shorted section of full-wave transmission line resonant at a frequency $f_p$, upon the application of frequencies $f_p$ and $f_s$, wherein $f_s$ is equal to one-half $f_p$.

FIG. 2*a* is a modification of the transmission line of FIG. 1.

FIG. 2*b* represents the standing waves developed along the transmission line of FIG. 2*a* upon application of frequencies $f_p$ and $f_s$.

Figure 1:
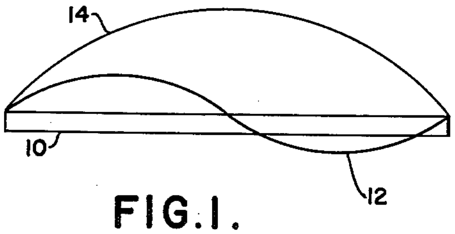

In parametric circuits, the more effective form of parametric excitation of subharmonics is obtained through the use of an unsymmetric non-linearity. Consider now the circuit indicated in FIG. 1 where a pump signal having a frequency, $f_p$, is applied to a shorted transmission line, 10, which is electrically a full wave length long at frequency $f_p$, resulting in a standing wave, indicated by curve 12, produced thereon, additionally, a signal frequency having a frequency $f_s$ introduced on the line, also produces a standing wave and, for the case illustrated in FIG. 1 wherein $f_s$ is equal to one half $f_p$, the standing wave produced by $f_s$ is indicated by curve 14. If transmission line 10 exhibits a non-linearity uniformly along the length of the line there is no energy exchange between the pump and signal frequencies. That this is true is shown in FIG. 1, since if, in accordance with known parametric amplification principles, the relative phase is correct for signal growth in the left-hand half of the line, then it necessarily follows that the phase relationship in the right-hand half are correct for signal attenuation, and no net effect occurs.

Various solutions to this problem are shown in copending application Serial Number 861,595 filed December 23, 1959 on behalf of the inventor of this application and also assigned to the assignee of this application. A first of these solutions is illustrated in FIG. 2*a* wherein a shorted stub is secured to the center point of the uniform non-linear transmission line 10 of FIG. 1. This shorted stub 16 is one-half wave length long at frequency $f_p$ thus presenting a short circuit at the center of the transmission line to frequency $f_p$. However, stub 16 is one-quarter wave length long at frequency $f_s$, thus presenting an open circuit at the center of line 10 to frequency $f_s$.

Figure 2B:
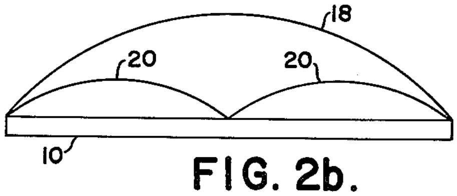
Figure 2A:
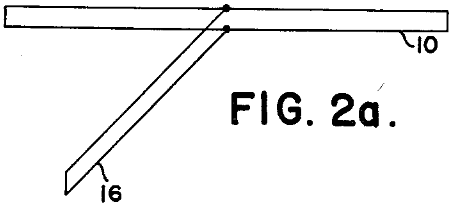

The standing waves on the transmission line 10, as modified by tuning stub 16 of FIG. 2*a* produced by the application of waves $f_p$ to both halves of line 10 are next illustrated in FIG. 2*b*. As there shown, the standing wave produced by frequency $f_s$, indicated as curve 18, is seen to be the same as that produced by frequency $f_s$ as shown by curve 14 in FIG. 1. However, the standing wave now produced by frequency $f_p$, indicated as curve 20, is seen to be symmetric with respect to the center of line 10. Therefore, the effect of stub 16 upon line 10 is to leave the standing wave produced by the signal frequency $f_s$ uneffected, but to decouple the two halves of the line 10 with respect to each other at the pump frequency $f_p$, thus making it possible to excite each of the left and right halves of transmission line independently and also in phase with each other. In this manner if the relative phase is correct for signal growth in the left half of the line, the phase relationship in the right half of the line is additionally correct for signal growth and the necessary parametric excitation of a subharmonic wave is provided.

Figure 3:
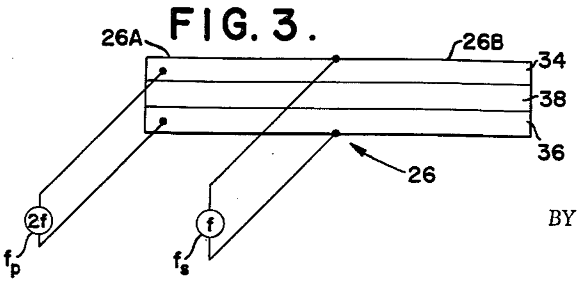
FIG. 3 is a schematic diagram of a preferred embodiment of the parametric circuit of the invention.

Referring now to FIG. 3 there is shown a preferred embodiment of the superconductive parametric circuit of the invention. As shown in FIG. 3, a transmission line 26 is formed of a pair of half wave length sections, at frequency $f_p$, of superconductive transmission line 26A and 26B. Each of the sections 26A and 26B are fabricated of different superconductive materials, with each of the superconductive materials exhibiting a different critical temperature. The critical temperature is defined as the temperature at which the transition between the superconducting and resistive states occurs. As briefly mentioned above and as more particularly described in detail hereinafter, the non-linearity exhibited by a superconductive transmission line is a function of the penetration depth of magnetic fields into the conductors of the transmission line.

Figures 4, 6:
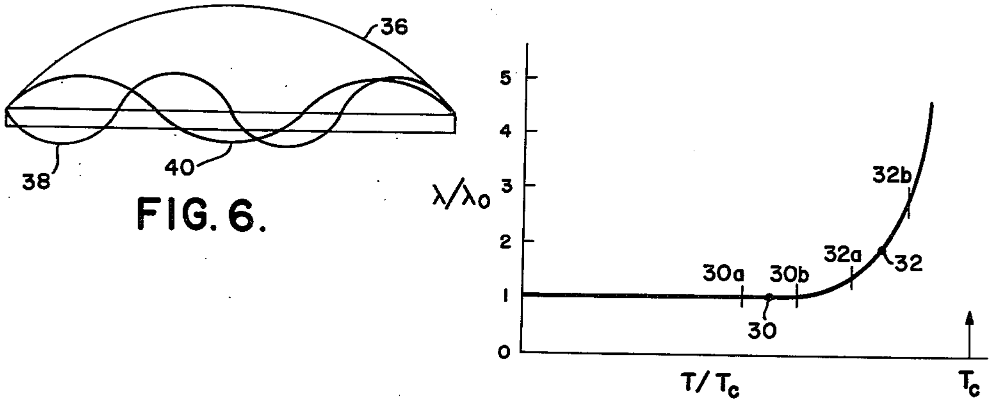
FIG. 4 is a curve representing the variation in penetration depth of magnetic fields into a superconducting material as a function of temperature.
FIG. 6 represents the standing waves developed along a transmission line resonant to three frequencies as in FIG. 5.

Referring now to FIG. 4 there is illustrated a generalized plot which illustrates the penetration depth in a superconductive material as a function of the operating superconductive temperature. The ordinate of FIG. 4 indicates the penetration depth, $\lambda$, normalized with respect to the penetration depth, $\lambda_o$, at absolute 0. The abscissa of FIG. 4 indicates the superconductive operating temperature T normalized wth respect to $T_c$, the critical temperature of the superconductive material. Since line 26 is generally operated at a single superconductive tempertaure, it is possible, by properly choosing the superconductive materials, to obtain a relatively large nonlinearity in one of the sections 26A and 26B and simultaneously obtain a relatively weak or nonexistent nonlinearity in the other section. In this manner, by adjusting the relative phase between the pump and signal frequencies to that which is correct for signal growth in the portion of line 26 which exhibits the relatively large nonlinearity, and allowing the phase relationships which are correct for signal attenuation to occur in the remaining portion of line 26, a net exchange of energy between the two signals it attained.

The manner in which the sections of superconductive transmission line 26 exhibit different degrees of nonlinearity can be explained again with reference to FIG. 4. FIG. 4 illustrates the general variation of penetration depth as a function of temperature for superconductive materials. Further, the inductance of superconductive transmission line is a direct function of the penetration depth therein, since the inductance is determined by the volume in which the magnetic field is contained; the larger the volume, the larger the inductance. As shown in FIG. 4, the penetration depth, and therefore the inductance, is essentially constant as the temperature increases from absolute 0 to approximately 0.8 of the critical temperature of the material. As the temperature further increases, the penetration depth, and hence the inductance, exponentially increases. At a particular superconductive temperature, a first material can be chosen, as by way of example lead, for section 26A in which the penetration depth is that indicated as 30 in FIG. 4. A second material, which may be by way of example tin, can be chosen for section 26B to have, at the particular operating temperature, a penetration depth as indicated as 32 in FIG. 4. Further, it should be noted, that the critical temperature of the material is modified by current flow through or a magnetic field applied to, the material. Increased current flow, or an applied magnetic field, causes a corresponding decrease in critical temperature. A limiting current, known as the Silsbee current, and a limiting magnetic field, known as the critical field, is obtained at which the material is no longer superconducting.

In this manner, the application of frequencies $f_p$ and $f_s$ to transmission line 26 is effective to modify the critical temperature, and thus the penetration depth in sections 26A and 26B. This modification is shown in FIG. 4, by points **30*a* and 30*b* surrounding point 30, and points 32*a* and 32*b* surrounding point 32. As shown in FIG. 4, there is essentially no variation in the penetration depth, or inductance, of the material of section 26A at the particular operating temperature. However, with respect to the material of section 26B there is a relatively large unsymmetrical variation in penetration depth at the particular operating temperature. Thus, as frequencies $f_p$ and $f_s$ cause an increase in the effective critical temperature of the material of section 26B, a relatively large increase in the penetration depth, and hence the inductance, of this section of the line is obtained, as indicated by the distance between 32 and 32*b*. Conversely, a lowering of the effective critical temperature produces a minor change in the penetration depth as shown by the distance between 32 and 32*a*. It now can be seen, that the portion of this curve between points 32*a* and 32*b* which indicates the variation in inductance of section 26B upon the application of frequencies $f_p$ and $f_s$, corresponds, in general, to the characteristic curves of a reversed biased semiconductor diode. Thus, line 26 comprises a relatively linear section of superconductive transmission line at 26A, and a relatively non-linear section of superconductive transmission line at 26B**.

Again referring to FIG. 3, transmission line 26 comprises a first section 26A, which may be of lead, and a second section 26B, which may be of tin, although various other combinations of superconductive mtaerials may be employed. Again, referring to FIG. 3, transmission line 26 is shown consisting of a pair of superconductive conductors 34 and 36, separated by a dielectric 38. Connected to transmission line 26 are sources of frequency $f_p$ and $f_s$, where $f_s$ is again one-half of $f_p$. In response to these applied signals little or no parametric interaction occurs in section 26A; the parametric energy exchange being obtained in setcion 26B. By proper phasing of frequencies $f_p$ and $f_s$, it is possible to have the relative phase between these signals correct for signal growth in section 26B. For this to be true, it should be noted, with reference to FIG. 1, that the phases of these signals can be constructed as correct for signal attenuation in section 26A. However, with reference to FIG. 4, it is seen that little or no attenuation occurs in this section for the chosen material and particular operating temperature. The above described manner in which the circuit of FIG. 3 is operated, that is signal enhancement in a first section, 26B, and little or no signal attenuation in a second section, 26A, is also obtained in several further embodiments of the invention. By way of example, line 26 may be fabricated of a single superconductive material, such as lead, and a biasing current then is employed in the second section to modify the critical current, and thus the penetration depth, thereof. Again, with reference to FIG. 4 and employing the same particular superconductive temperature as shosen in the above described example, the penetration depth is again that shown as 30. Next, a direct current from any suitable direct current source, suitably decoupled from the signal circuits, is caused to flow through section 26B, to decrease its critical temperature so that operating point 32 again is obtained. The operation of this embodiment, then of course, is the same as that above described.

Again a magnetic field may be applied to one-half of the transmission line to modify the critical temperature thereof. A magnetic field applied external to section 26B of superconductive transmission line 26 of FIG. 3, which section in the absence of the applied field exhibits a penetration depth indicated as 30 in FIG. 4, is effective to increase the penetration depth of section 26B again to point 32. Alternately, this same effect can be obtained by operating each section of the line at a different temperature. However, because of the slight difference in temperature necessary, care must be taken to maintain each section of the line at exactly the proper temperature.

It should be noted that although each of the above embodiments have been described solely with reference to a shorted length of resonant superconductive transmission line, this description was for purposes of illustration only, and various types of resonant lines may be employed as will be understood by those skilled in the art. By way of example, an open circuited resonant line may additionally be employed. Further, only paricular operating points for each section of the line have been illustrated, but as should now be understood, a wide selection of operating points may be made, with the only restriction being that, in response to the coupled signals, a first section of the line exhibit a relatively constant inductance and a second section of the line exhibit a non-linear inductance.

A still further embodiment of the parametric circuit of the invention is next described. Referring again to FIG. 3, there is shown a shorted resonant superconductive transmission line 26, including first and second sections 26A and 26B. As described above with respect to the first embodiment, sections 26A and 26B are fabricated of different superconductive materials, by way of example lead and tin, respectively. Such a line is capable, of and by itself, of supporting a parametric interaction at a particular superconductive temperature. Lowering of the particular superconductive temperature is effective to shift operating points 30 and 32 (see FIG. 4) each to the left so that section 26B no longer exhibits a nonlinear inductance in response to frequencies $f_p$ and $f_s$. Next, the establishment of a bias current flowing through both sections is effective to return sections 26A and 26B to operating points 30 and 32. Since the bias current now flows through a completely superconducting path, consisting of conductors 34 and 36 and the short circuit terminations, which in this embodiment are additionally superconducting, the bias current is conveniently obtained by the use of an induced persistent current. In this manner, with the persistent current present, parametric excitation is obtained. The quenching of the persistent current, through the momentary application of a magnetic field of sufficient magnitude to destroy superconductivity in section 26B returns line 26 to a uniform line wherein parametric excitation is absent. Thus, by selectively inducing or quenching a magnetic field, line 26 is switchable between an active and passive device.

Figure 5:
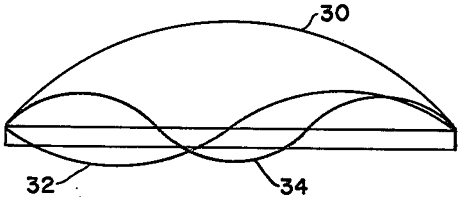
FIG. 5 represents the standing waves developed along a transmission line resonant to three frequencies.

A still further embodiment of the invention employs the use of a third frequency commonly known as an idling frequency together with the signal and pump frequency. As illustrated, by way of example in FIG. 5, there is shown a resonant transmission line wherein the pump frequency $f_p$ causes a standing wave 34 indicated as one and one-half wave lengths. Additionally, the signal frequency causes a standing wave 32 equal to a full wave length, and the idling frequency exhibits a standing wave 30 of one-half wave length. Under these conditions, the following frequency relationship is true:

$$f_s + f_i = f_p$$

$$f_i = \tfrac{1}{3} f_p$$

$$f_s = \tfrac{2}{3} f_p$$

As shown in the figure, the transmission line, which is resonant to all of these three frequencies, exhibits three nodes in the interior portion of the line. Of course, at every one of these nodes the parametric interaction will change sign. It should be understood that the node for the small signal is in the portion where it clearly causes zero total parametric interaction and therefore must be eliminated. This can be done as shown in the above referenced co-pending application by employing a tuning stub connected to the middle of the line and exciting each half of the line separately and in phase at the signal frequency. This stub, which is one-quarter wave length long at the idling frequency, and shorted at the far end, will act as an open circuit to the pump and idling frequencies and as a short circuit to the signal frequency. As is understood, according to the invention from the operation of the circuit as described with respect to FIG. 3, it is possible to operate the transmission line with only one-half exhibiting the necessary non-linearity and therefore eliminating the use of the tuning stub.

Various other frequency relationships are, of course, possible including that shown in FIG. 6, by way of example. As shown in FIG. 6 the following relationships are true wherein the pump frequency 38 is again equal to the sum of the signal and idling frequencies 36 and 40, respectively, that is:

$$f_p = f_s + f_i$$

$$f_i = \tfrac{1}{4} f_p$$

$$f_s = \tfrac{3}{4} f_p$$

Again a pair of shorted stubs one-quarter wave length of the way from each end, and a wave length long at the pump frequency decouple the two end sections at the pump frequency. By pumping the two end sections in phase, the center half of the line remains unpumped and the parametric interaction in the two end sections will be in phase.

It is important to note, that the superconductive transmission line parametric circuits above described must necessarily employ relatively thin conductor materials. That this is necessary, results from the fact that the penetration depth is generally only a few thousand Angstrom units in thickness, and if relatively thick conductors were employed, the variation in inductance between sections as well as the variation in the inductance in the non-linear section in response to the applied frequencies, would be a minute fraction of the total inductance of the line. For this reason, it is generally desirable to maintain the superconductive conductors approximately equal in thickness to the magnitude of the penetration depth into the materials as described in the above referenced co-pending application, Serial Number 16,431.

Further, since the circuits of this invention require thin superconductive films, as do the circuits of the prior art, various combinations of all of these circuits may be advantageously formed in a single operation through the vacuum deposition of the necessary materials, to thereby form complex electrical circuits.

While the invention has been particularly shown and described with reference to preferred embodiments thereof, it will be understood by those skilled in the art that various changes in form and details may be made therein without departing from the spirit and scope of the invention.

What is claimed is:

1. A parametric amplifier circuit comprising; a resonant superconductive transmission line of first and second sections; each of said first and second sections being electrically one-half wave length at a frequency 2F; means maintaining said circuit as a predetermined superconductive temperature; said first section having only a slight magnetic field penetration depth variation; said second section having a magnetic field penetration depth variation substantially greater than that of said first section at said predetermined temperature; and means coupling a signal of frequency 2F and a signal of frequency F to said line, said signals being effective to modify the penetration depth substantially in said second section only to transfer energy from said signal of frequency 2F to said signal of frequency F.

2. The circuit of claim 1 further including means to establish bias current flow through said second section.

3. The circuit of claim 1 further including means for applying a magnetic field to said second section.

4. A parametric amplifier circuit as set forth in claim 1 wherein each of said sections includes a pair of thin film superconductive conductors separated by a dielectric medium.

5. A parametric amplifier circuit comprising; a shorted superconductive transmission line of first and second sections; each of said first and second sections being one-half wave length at a frequency 2F; said first section including a pair of thin film lead conductors separated by a dielectric medium; said second section including a pair of thin film tin conductors separated by said dielectric medium; means maintaining said circuit at a superconductive temperature at about yet below the critical temperature of said tin; and means coupling a signal of frequency 2F and a signal at a subharmonic frequency F to said line.

No references cited.